US011120184B2

United States Patent
Amaru et al.

(10) Patent No.: US 11,120,184 B2
(45) Date of Patent: Sep. 14, 2021

(54) SATISFIABILITY SWEEPING FOR SYNTHESIS

(71) Applicant: Synopsys, Inc., Mountain View, CA (US)

(72) Inventors: Luca Gaetano Amaru, Santa Clara, CA (US); Jiong Luo, Fremont, CA (US); Patrick Vuillod, St. Bernard du Touve (FR)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/904,077

(22) Filed: Jun. 17, 2020

(65) Prior Publication Data

US 2020/0394352 A1    Dec. 17, 2020

Related U.S. Application Data

(60) Provisional application No. 62/937,045, filed on Nov. 18, 2019, provisional application No. 62/862,231, filed on Jun. 17, 2019.

(30) Foreign Application Priority Data

Jun. 20, 2019  (EP) .................................... 19305796

(51) Int. Cl.
   *G06F 30/327* (2020.01)
   *G06F 30/31* (2020.01)
   *G06F 119/16* (2020.01)

(52) U.S. Cl.
   CPC ............ *G06F 30/327* (2020.01); *G06F 30/31* (2020.01); *G06F 2119/16* (2020.01)

(58) Field of Classification Search
   CPC ...... G06F 2119/16; G06F 30/20; G06F 30/31; G06F 30/327; G06F 30/33; G06F 30/3323; G06F 30/3308; G06F 30/367
   USPC .................................................. 716/104, 106
   See application file for complete search history.

(56) References Cited

U.S. PATENT DOCUMENTS

2011/0093824 A1*  4/2011 Baumgartner ...... G06F 30/3323
                                                        716/106

OTHER PUBLICATIONS

Mishchenko et al., Fraigs: A unifying representation for logic synthesis and serification, 2005, available at Attp//www.eecs.berkeley.edu/~alanxi/publications/200/tech05 fraigs.pdf.
Kuehlmann et al., "Robust boolean reasoning for equivalence checking and functional property verification," *IEEE Trans. On Computer-Aided Design of Integrated Circuits and Systems*, vol. 21, No. 12, pp. 1377-1394, 2002.

(Continued)

*Primary Examiner* — Paul Dinh
(74) *Attorney, Agent, or Firm* — Sterne, Kessler, Goldstein & Fox P.L.L.C.

(57) ABSTRACT

A system and method for SAT-sweeping is disclosed. According to one embodiment, a method includes determining gate classes by inputting simulation patterns to gates in an integrated circuit design, selecting a candidate gate based on an inverse topological ordering of the gates, and then selecting a driver gate belonging to the same gate class as the candidate gate. A SAT-solver is called based on the candidate gate and the driver gate to confirm equivalence. The candidate gate and the driver gate are then merged in the integrated circuit design.

20 Claims, 6 Drawing Sheets

(56) References Cited

OTHER PUBLICATIONS

Qi Zhu et al., "Sat sweeping with local observability don't-cares," in *DAC* , 2006.

A. Mishchenko et al., "Improvements to combinational equivalence checking," in *ICCAD* , 2006.

M. Fujita, "Toward unification of synthesis and verification in topologically constrained logic design," *Proc. Of the IEEE* , vol. 103, pp. 2052-2060, Nov. 2015.

L. Amaru et al., "Enabling exact delay synthesis," *in ICCAD*, 2017.

A, Mishchenko et al., "Scalable don't-care-based logic optimization and resynthesis," *ACM Trans. Reconfigurable Technol. Sys.*, vol. 4, No. 4, pp. 34:1-34:23, 2011.

P. Fiser et al., "Sat-based generation of optimum function implementations with xor gates," *in Euromicro DSD*, 2017.

M.L. Case et al., "Merging nodes under sequential observability," in *DAC*, 2008.

J.S. Zhang et al., "Syuumnetry detection for large boolean functions using circuit representation, stimulation, and satisfiability," in DAC, 2006.

B.-H. Wu et al., "A robust functional eco engine by sat proof minimization and interpolation techniques," in *ICCAD*, 2010.

S.M. Plaza et al., "Node mergers in the presence of don't cases," in *ASP-DAC*, 2007.

S. Krishnaswamy et al., "Deltasyn: An efficient logic difference optimizer for eco synthesis," in *ICCAD*, 2009.

M. Elbayoumi et al., "Novel sat-based invariant-directed low-power synthesis," in *ISQED*, 2015.

W. Haaswijk et al., "Sat based exact synthesis using dag topology families," in *DAC*, 2018.

Z. Hassan et al., "A study of sweeping algorithms in the context of model checking," *Ganesh Gopalakrishnan University of Utah USA*, p. 30, 2011.

D. Brand, "Verification of large synthesized designs," in *ICCAD*, 1993.

M. N. Velev, "Efficient translation of Boolean formulas to cnf in formal verification of microprocessors," in *ASP-DAC*, 2004.

N. S. Nikklas Een et al., "Applying logic synthesis for speeding up sat," *Conf. on Theory and Applications of SAT Testing*, vol. 4, Dec. 2007.

A. A. Sohanghpurwala et al., "Hardward accelerated SAT solvers—A survey," J. Parallel Distrib. Comput. 106 (2017) 170-184.

C. P. Gomes et al., Satisfiability Solvers, "Handbook of Knowledge Representation," 2008.

A. Kuehlmann et al., "Combinational and Sequential Equivalence Checking," Logic Synthesis and Verification, 2002.

* cited by examiner

SATISFIABILITY SWEEPING FOR SYNTHESIS

CROSS-REFERENCE TO RELATED APPLICATIONS

This application is a non-provisional application of U.S. Provisional Patent Application Ser. Nos. 62/862,231 and 62/937,045, which were filed on Jun. 17, 2019 and Nov. 18, 2019, respectively. Accordingly, this application claims priority under 35 U.S.C. § 119(e) to U.S. Provisional Patent Application Ser. Nos. 62/862,231 and 62/937,045. U.S. Provisional Patent Application Ser. Nos. 62/862,231 and 62/937,045 are hereby incorporated by reference in their entirety.

This application claims priority under 35 U.S.C. § 119(a) to European Patent Application No. EP19305796, which was filed on Jun. 20, 2019. European Patent Application No. EP19305796 is hereby incorporated by reference in its entirety.

TECHNICAL FIELD

The present disclosure relates generally to an electronic design automation system. In particular, the present disclosure relates to a system and method for providing satisfiability sweeping (SAT-sweeping) for integrated circuit synthesis.

BACKGROUND

SAT-sweeping is a technique for simplifying logic networks routinely used in synthesis applications within an electronic design automation (EDA) system. The technique includes merging gates that are proven equivalent (up to complementation) by running simulation and SAT solving in synergy. Logic networks encountered during synthesis are often shallow, mapped into gates, and contain only a few percent of mergeable gates. Accordingly, the majority of the runtime for a traditional SAT-sweeper is spent in proving non-equivalence and propagating the consequences of non-equivalence, rather than proving equivalences that are useful for synthesis.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

In the drawings, like reference numbers generally indicate identical or similar elements. Additionally, generally, the left-most digit(s) of a reference number identifies the drawing in which the reference number first appears.

DETAILED DESCRIPTION

Aspects of the present disclosure relate to improvements in SAT-sweeping for integrated circuit synthesis. In current SAT-sweeping techniques, simulation is first used to identify pairs of gates in an integrated circuit design that could possibly be merged. Merging two gates is advantageous because it results in one less gate, and thus less power is required to run the integrated circuit, less heat is given off by the integrated circuit, and the circuit has a smaller footprint (takes up less space). Then, a computationally expensive SAT solving system (referred to as a SAT-solver herein) is called to confirm the two gates are indeed equivalent. However, the SAT-solver usually proves the two gates are not equivalent and thus cannot be merged. In other words, the two gates were false candidates for merging.

In the present disclosure, the present system and method generate simulation patterns that decrease the number of false gate candidates for merging. A SAT-solver with a low conflict budget is utilized to resolve calls to the SAT-solver quickly. Further, the gates are approached in an inverse topological order and may utilize toggle rates at gate outputs to generate the simulation patterns.

In the present disclosure, the present system and method merge gates. Candidate gates for merging are approached in an inverse topological order (i.e., candidate gates are processed top-down), reducing redundant computation and reducing expensive calls to a SAT-solver.

Figure 1:
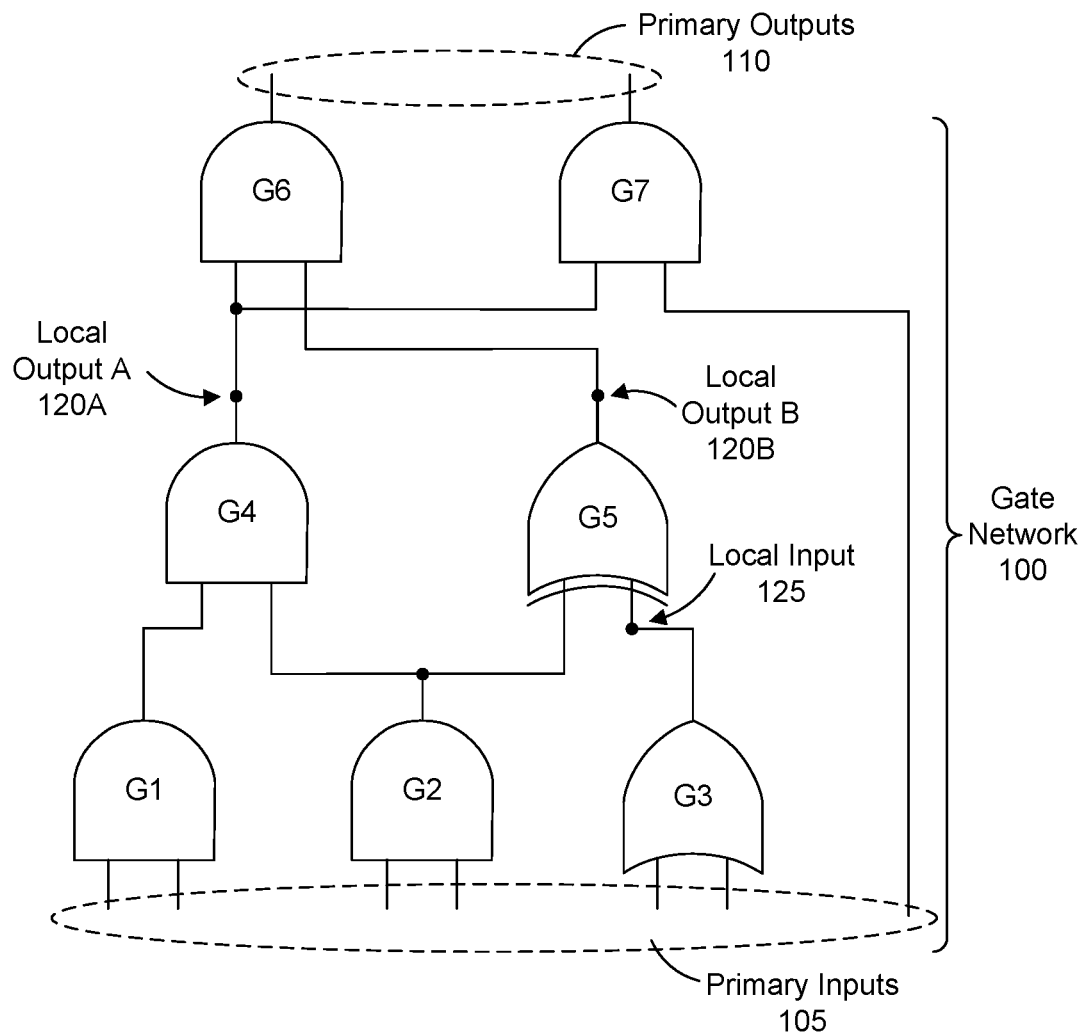
FIG. 1 depicts a logical gate network in accordance with one or more embodiments.

FIG. 1 depicts an example gate network 100 in accordance with one or more embodiments. As depicted in FIG. 1, gate network 100 includes multiple interconnected logic gates (e.g., G1, G2, G3, G4, G5, G6, and G7). Each of the logic gates G1-G7 may correspond to a type of logic gate, for example, an OR gate, an AND gate, an XOR gate, and a NAND gate. Gate network 100 may correspond to the entirety or just a portion of an integrated circuit design. Gate network 100 many have any number of interconnected gates.

In one or more embodiments, the one or more inputs to gate network 100 are referred to as primary inputs 105. Similarly, the one or more outputs from gate network 100 are referred to as primary outputs 110. Gate network 100 may have any number of primary inputs and primary outputs. The output of a gate within gate network 100 may be referred to as a local output. For example, G4 has local output A 120A, while G5 has local output B 120B. The input to a gate within gate network 100 may be referred to as a local input. For example, G5 has local input 125. The local output of one gate may correspond to a local input of one or more other gates. For example, as depicted in FIG. 1, the local output of gate G2 corresponds to a local input of gate G4 and also to a local input of gate G5

FIG. 1 depicts multiple simulation patterns 150 (e.g., SP1, SP2, SPN). In one or more embodiments, the number of binary values in each of simulation patterns 150 equals the number of primary inputs 105. Each of simulation patterns 150 may be applied to primary inputs 105 at different times. For example, SP1 may be applied to primary inputs 105 at time t1, while SP2 may be applied to primary inputs 105 at time t2. As a result of applying (e.g., inputting) simulation patterns 150 to primary inputs 150, a series of binary values will appear at each gate output (local or primary).

If two or more gates output the identical series of binary values, the two or more gates are considered members of the same gate class. For example, if G4 outputs {1, 1, 0, 1} and if G7 also outputs {1, 1, 0, 1}, G4 and G7 are considered members of the same gate class. In one or more embodiments, if the output of one gate is always the inverse of the output of another gate (e.g., one gate is the complementation of the other gate), the two gates are also considered members of the same gate class. For example, if G6 outputs {0, 1, 0, 1} and if G3 outputs {1, 0, 1, 0}, G6 and G3 are considered members of the same gate class. If two gates output neither the identical series of binary values nor the inverse series of binary values, the two gates are considered members of different gate classes. For example, if G1 outputs {1, 1, 1, 1} and G3 outputs {1, 0, 1, 0}, G1 and G3 are considered members of different gate classes.

In one or more embodiments, when two gates are members of different gate classes, it is not possible to merge the two gates. In contrast, when two gates are members of the same gate class, it might be possible to merge the two gates. However, merely belonging to the same gate class is not a guarantee that the two gates will always generate the same binary output (or that one gate will always output the inverse of the other gate) because simulation patterns 150 are unlikely exhaustive. Instead, a satisfiability solver (SAT-solver) may be used to confirm the two gates will always output identical binary values (or will always output the inverse of each other). Additionally, when two gates are found to be non-equivalent, the SAT-solver may also provide a counter-example simulation pattern that results in the two gates outputting different binary values (or show one gate does not always output the inverse of the other gate).

Those skilled in the art, having the benefit of this detailed description, will appreciate that calls to SAT-solvers to prove equivalence are expensive in time and/or computational resources. Moreover, many gate networks, especially those encountered during synthesis, in reality only have a small percentage of mergeable gate. Accordingly, the grand majority of runtime is spent proving pairs of gates are non-equivalent.

Figure 2:
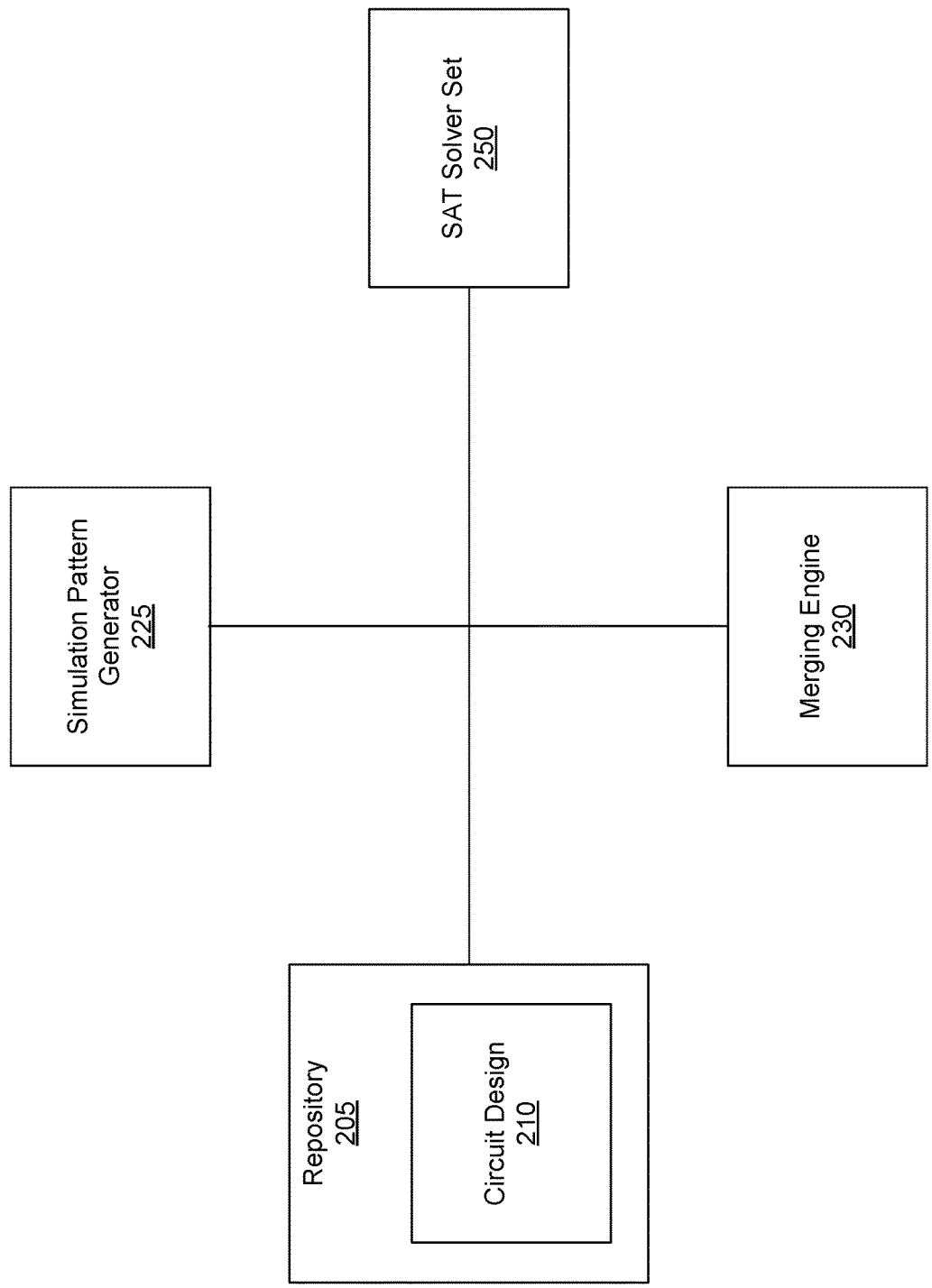
FIG. 2 depicts a system for SAT-sweeping in accordance with one or more embodiments.

FIG. 2 depicts a system for SAT-sweeping in accordance with one or more embodiments. As depicted in FIG. 2, the system has multiple components including, for example, a repository 205, a simulation pattern generator 225, a merging engine 230, and SAT solver set 250 (i.e., one or more SAT solvers). Each of these components may correspond to any combination of hardware and software. Additionally or alternatively, each of these components may execute on one or more computing devices (e.g., a server, a mainframe, a desktop personal computer (PC), a laptops, a tablet PC, and a smart phone) connected by a network having wired and/or wireless segments.

In one or more embodiments, simulation pattern generator 225 is configured to generate a set of simulation patterns for the integrated circuit design 210 stored in repository 205. These simulation patterns may be used to group the gates of circuit design 210 into one or more gate classes (discussed above). In order to generate the simulation patterns, simulation pattern generator 225 may explore the gates in circuit design 210 in an inverse topographical order (i.e., top-down order) and make calls to a SAT-solver in SAT-solver set 250. An example implementation of simulation pattern generator 225 is discussed below in reference to FIG. 4.

In one or more embodiments, merging engine 230 is configured to merge pairs of gates (e.g., merge a candidate gate and a driver gate) in circuit design 210. The merging engine 230 may utilize the simulation patterns from simulation pattern generator 225 to quickly identify gates in circuit design 210 that cannot be merged. In order to determine gate pairs that can be merged, the merging engine 225 may visit candidate gates in circuit design 210 in an inverse topographical order and make calls to a SAT-solver in SAT-solver set 250. An example implementation of merging engine 230 is discussed below in reference to FIG. 3.

Figure 3:
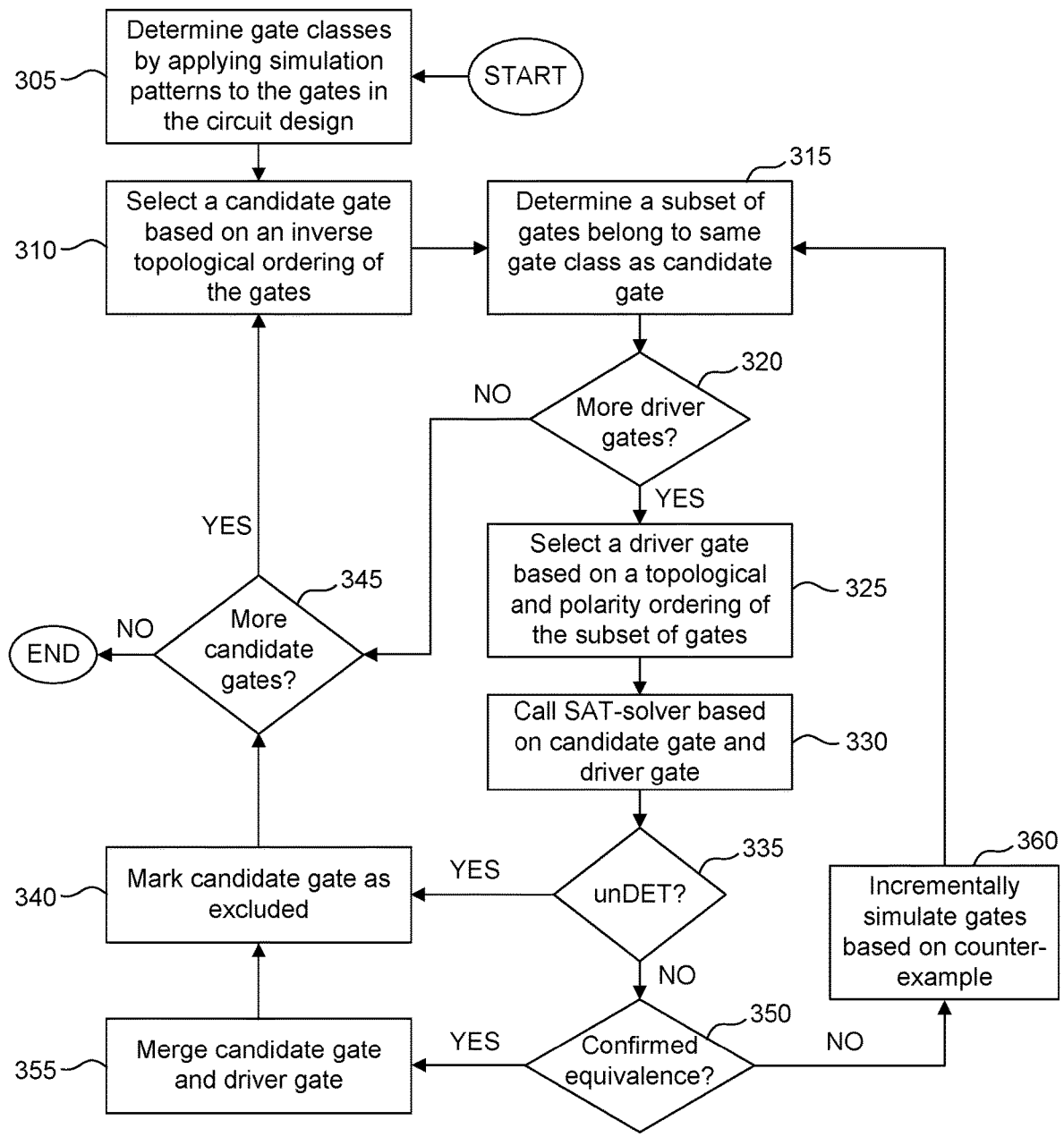
FIG. 3 depicts a flowchart for merging gates using a SAT-solver in accordance with one or more embodiments.

FIG. 3 depicts a flowchart for merging gates using a SAT-solver in accordance with one or more embodiments. One or more steps in FIG. 3 may be executed by the merging engine 230, discussed above in reference to FIG. 2. In one or more embodiments, one or more of the steps depicted in FIG. 3 may be omitted, repeated, and/or performed in a different order than the order depicted in FIG. 3. Accordingly, the scope of the invention should not be considered limited to the specific arrangement of steps depicted in FIG. 3.

At 305, gate classes and the membership of each gate class are determined by applying (e.g., inputting) multiple simulation patters to the gates in the integrated circuit design. Specifically, the multiple simulation patters are applied to the primary inputs associated with the gates. As a result of applying (e.g., inputting) the simulation patterns, a series of binary values will appear at the output of each gate. If two or more gates output the identical series of binary values, the two or more gates are considered members of the same gate class. If the output of one gate is always the inverse of the output of another gate (e.g., one gate is the complementation of the other gate), the two gates are also considered members of the same gate class. Otherwise, the two gates are considered to be members of different classes. Quality simulation patterns can reduce the number of members in a gate class. Details regarding the generation of quality simulation patterns are discussed below in reference to FIG. 4.

At 310, a candidate gate is selected from among the gates. The candidate gate is selected based on an inverse topological ordering of the gates. In other words, gates closer to the primary outputs are selected before gates further away from the primary outputs. This effectively explores the circuit design in a top-down approach.

In one or more embodiments, if a gate is marked as excluded or some other skipping condition exists (e.g., synthesis restrictions including a don't touch property set by the user), the gate is skipped and the next gate based on the ordering is selected as the candidate gate.

At 315, the subset of gates belonging to the same gate class as the candidate gate are determined. The subset of gates may be determined based on the gate classes determined at 305.

At 320, it is determined whether there is at least one gate in the subset that has not yet been selected as a driver gate. When it is determined that all gates in the subset have been selected as the driver gate, the process proceeds to 345. When it is determined that there is at least one gate in the subset that has not yet been selected as the driver gate, the process proceeds to 325.

At 325, a driver gate is selected from the subset of gates. Accordingly, the driver gate and the candidate gate belong to the same gate class and can possibly be merged. The driver gate may be selected based on a topological and polarity ordering of the subset of gates. In other words, gates with outputs matching the candidate gate are considered before gates that always output the inverse of the candidate gate. Then, as a secondary criterion, gates closer to the primary inputs are selected before gates further away from the primary inputs. This ordering effectively looks for driver gates bottom-up in the circuit design.

In one or more embodiments, the selected driver is skipped and the next driver gate based on the ordering is selected as the driver gate if one or more skipping conditions are true. Example skipping conditions include non-precedence in topological order, so that no loops are introduced, special markings on driver gate (e.g., driver gate marked as excluded), and timing checks for timing-bounded merges.

At 330, a SAT-solver is called based on the candidate gate and the driver gate. This may include translating the equivalence problem (i.e., whether the candidate gate and the driver gate always output the same binary value or whether the candidate gate always outputs the inverse of the driver gate) into conjunctive normal form (CNF) and sending this form to the SAT-solver. During the CNF translation, preference may be given to the method (e.g., gate to cnf, sop to cnf, aig to cnf, lut-covering to cnf, etc.) which minimized the number of variables.

At 335, it is determined whether the answer provided by the SAT-solver is undeterminable (unDET). An answer of unDET likely means the conflict and propagation budget provided to the SAT-solver are not sufficient to obtain a solution. In such a case, it is likely that the logic included is not CNF friendly or just translated to a hard SAT problem. When it is determined that the answer provide by the SAT-solver is unDET, the process proceeds to 340. When it is determined that the answer provided by the SAT-solver is not unDET, the process proceeds to 350.

At 350, it is determined whether the SAT-solver confirmed the equivalence of the candidate gate and the driver gate (or the candidate gate and the driver gate with an inverter attached to the output of the driver gate). Equivalence may be confirmed by an answer of unsatisfied (unSAT) from the SAT-solver. In response to the unSAT answer, the process proceeds to 355. If the SAT-solver does not confirm equivalence, the SAT-solver may return an answer of SAT with a counter-example simulation pattern (i.e., a simulation pattern that will show the candidate gate and the driver gate do not belong to the same gate class). When the SAT-solver does not confirm equivalence, the process proceeds to 360.

At 355, the candidate gate and the driver gate are merged. The merging operation may include adding a connection from a local output of the driver gate to any local input that was connected to the local output of the candidate gate. When the candidate gate is a complementation of the driver gate (i.e., the candidate gate always outputs the inverse of the driver gate), the connection from the local output of the driver gate includes an inverse gate (e.g., NOT gate). The candidate gate may be deleted from the design. Lower-level gates that only feed the now-deleted candidate gate may also be deleted from the design. In other words, when candidate gate A is merged with driver gate B, all the maximum fanout free code of gate A is deleted together with gate A. As discussed above, merging two gates is advantageous because it results in at least one less gate, and thus less power is required to run the integrated circuit, less heat is given off by the integrated circuit, and the circuit has a smaller footprint (takes up less space).

At 360, one or more of the gates are incrementally simulated based on the counter-example simulation pattern provided by the SAT-solver. Following the incremental simulation, a set of binary values are output from the outputs of some of the gates. The set of binary values may show that two gates previously believed to be equivalent (or one gate always the inverse of the other gate) and thus assigned to the same gate class, in actuality are not equivalent (or one gate is not always the inverse of the other) and thus do not belong to the same gate class. The set of binary values may show that the candidate gate and the driver gate do not belong to the same gate class (as confirmed by the SAT-solver at 350). Accordingly, during the execution of 315 following 360, the subset is refined. The refined subset does not include the driver gate (i.e., the driver gate is removed from the subset). Other gates belonging to other gate classes (as determined through incremental simulation based on the counter-example simulation pattern) will also be removed from the subset. By refining (e.g., reducing) the subset, the SAT-solver (at 330) will be called fewer times, reducing the execution time of the process in FIG. 3.

Further, as discussed above, candidate gates are approached in an inverse topological order. When we find a counter-example for a high-depth gate (e.g., a gate close to the primary outputs 110), it is likely that the counter-example will also disprove false positives (i.e., gates assigned to the same class that in actuality are neither equivalent nor complements of each other) in lower gates (e.g., gates closer to the primary inputs 105). This in turn reduces the size of one or more gates classes and thus reduces the number of times the computationally expensive SAT-solver is called (at 330).

At 340, the candidate gate is marked as excluded. When 340 is executed immediately following 335 (i.e., unDET has been returned by the SAT-solver), it is likely that the candidate gate is the root of a logic problem that is difficult and time consuming for the SAT-solver to solve. By marking the candidate gate as excluded, the SAT-solver will not be called to process this gate in future iterations, shortening the runtime of the depicted process. When 340 is executed immediately after 355, the candidate gate has been merged (e.g., removed from the design) and thus is marked as excluded as it should no longer be considered in any future iterations of the depicted process.

At 345, it is determined whether there exists at least one gate that has not yet been selected as a candidate gate. When it is determined that there is at least one gate that has not yet been selected as a candidate gate, the process proceeds to 310. Otherwise, the process ends.

Figure 4:
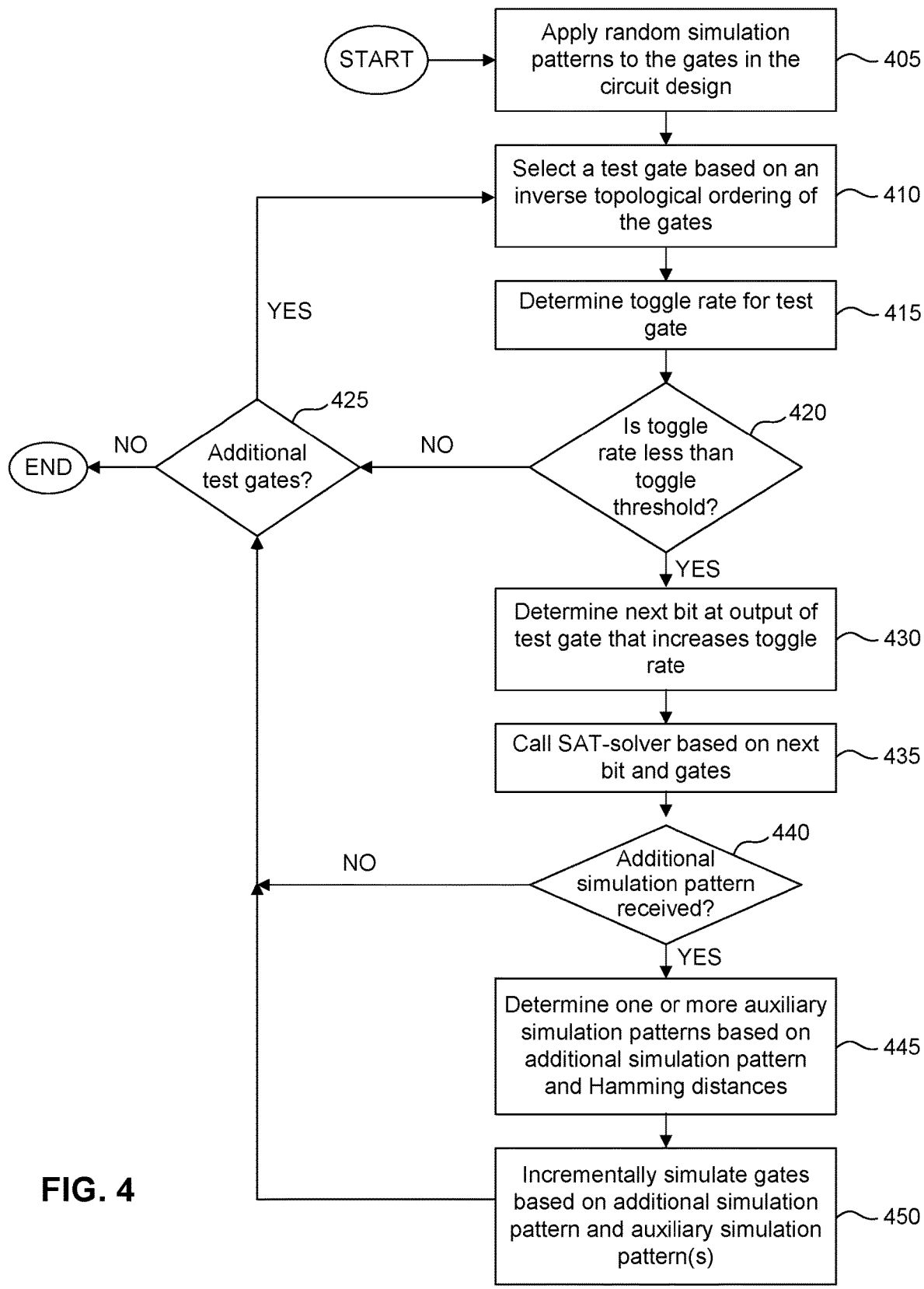
FIG. 4 depicts a flowchart for determining simulation patterns using a SAT-solver in accordance with one or more embodiments.

Those skilled in the art, having the benefit of this disclosure, will appreciate that by determining gate classes using quality simulation patterns (at 305), the membership in any given gate class is likely to be smaller (i.e., subsets at 315 may be smaller). This will result in fewer calls to the SAT-solver (at 330), reducing the execution time of the process depicted in FIG. 3. FIG. 4 discusses the generation of quality simulation patterns.

Further, those skilled in the art, having the benefit of this disclosure, will appreciate that by utilizing the inverse topological ordering (i.e., top-down approach) at 310, this reduces redundant computation. For example, if two outputs are equivalent, running sat-sweeping on the cone of logic being deleted (e.g., gates only feeding the candidate driver that is successfully merged) is avoided. This reduction in redundant computation would not occur if a bottom-up approach was taken at 310.

Further, those skilled in the art, having the benefit of this detailed description, will appreciate that by utilizing the topological and polarity ordering at 325, this ensures an advantageous merge is attempted first (i.e., a merge operation with no inverter gate needed for the connection between the candidate gate and the driver gate).

FIG. 4 depicts a process for generating simulation patterns using a SAT-solver in accordance with one or more embodiments. One or more steps in FIG. 4 may be executed by the simulation pattern generator 225, discussed above in reference to FIG. 2. In one or more embodiments, one or more of the steps depicted in FIG. 4 may be omitted, repeated, and/or performed in a different order than the order depicted in FIG. 4. Accordingly, the scope of the invention should not be considered limited to the specific arrangement of steps depicted in FIG. 4. One or more steps in FIG. 4 may be utilized at 305 of FIG. 3 and thus the process depicted in FIG. 4 may be executed before the process depicted in FIG. 3.

At 405, multiple random simulation patterns are applied to the primary inputs associated with the gates. As a result of applying (e.g., inputting) the random simulation patterns, a series of binary values is output from the output of each gate.

At 410, a test gate is selected from among the gates. The test gate is selected based on an inverse topological ordering of the gates. In other words, gates closer to the primary outputs are selected before gates further away from the primary outputs. This effectively explores the circuit in a top-down approach.

At 415, a toggle rate (TR) for the test gate is determined. In one or more embodiments, the toggle rate may be defined as the ratio of bit-toggles in the output of the test gate over the total number of values in the output of the test gate. For example, if the output of the test gate is {1, 0, 0, 1}, there are two toggles (e.g., 1-0, 0-1) and a total of four bits, so TR=2/4=0.5.

At 420, the toggle rate is compared with a toggle threshold. When the toggle rate equals or exceeds the toggle threshold, the process proceeds to 425. When the toggle rate is less than the toggle threshold, the process proceeds to 430.

At 430, the next bit at the output of the test gate that increases the toggle rate for the test gate is determined. The next bit may be determined by flipping the last binary value in the output of the test gate. For example, if the output at the test gate is {0, 0, 1, 1, 1}, the last bit is "1" and thus the next bit to increase the toggle rate would be "0". {0, 0, 1, 1, 1, 0} has a higher toggle rate than {0, 0, 1, 1, 1}.

At 435, a SAT-solver is called based on the gates and the next bit. The SAT-solver at 435 may be the same or different than the SAT-solver at 330, discussed above in reference to FIG. 3. The SAT problem is to determine an additional simulation pattern for application to the primary inputs that will result in the determined next bit (from 430) at the output of the test gate. The SAT-solver may provide one of three answers: (i) unsatisfiable (unSAT), which means that the test gate cannot assume the determined next bit with any additional simulation pattern; (ii) satisfiable (SAT), which means that the determined next bit at the output of the test gate is possible by an additional simulation pattern provided by the SAT-solver; and (iii) undeterminable (unDET), which means no answer was found within the solving budget.

At 440, it is determined whether an additional pattern was received from the SAT-solver (i.e., the answer from the SAT-solver is SAT). When it is determined that an additional simulation pattern is received, the process proceeds to 445. When it is determined that an additional simulation pattern was not received (i.e., the answer from the SAT-solver was unDET or unSAT), the process proceeds to 425.

At 445, one or more auxiliary simulation patterns are generated based on the additional simulation pattern and Hamming distances. For example, each of the one or more auxiliary simulation patterns may be the additional simulation pattern with one binary value inverted. In other words, each auxiliary simulation pattern may have a Hamming distance of 1 with respect to the additional simulation pattern. These auxiliary simulation patterns are likely to also satisfy the SAT problem and can be generated without the need to re-call the SAT-solver. The number auxiliary patterns generated depends on the difference between the toggle rate and the toggle threshold (at 420). Specifically, if the toggle rate and the toggle threshold are close, one auxiliary simulation pattern may be generated. If the toggle rate is far below the toggle threshold, multiple auxiliary simulation patterns may generated.

At 450, the gates are incrementally simulated based on additional simulation pattern and auxiliary simulation pattern(s). In one or more embodiment, incremental simulation will only propagate new values of simulation which differ from existing ones, thus maintaining minimum runtime overhead. This incremental simulation using the additional simulation pattern and the auxiliary simulation pattern(s) will result in new binary values at the output of some gates including the test gate. Moreover, the incremental simulation will increase the toggle rate of the test gate and hopefully increase the toggle rate of other gates below the test gate (i.e., gates lower than the test gate in the topology of the circuit design).

Those skilled in the art, having the benefit of this disclosure, will appreciate that it may be advantageous if the additional simulation pattern (from 435) only affects a small number of the primary inputs, as this corresponds to a reduction in (re)simulation (at 450), and thus a reduction in simulation time and computational resources. An additional simulation pattern with this property (i.e., only affects a small number of the primary inputs) may be achieved through incremental SAT-solver calls (at 435) including constraints on reducing the number of primary inputs.

At 425, it is determined if there are additional gates that have not yet been selected as a test gate. When it is determined there is at least one additional gate that has not yet been selected as a test gate, the process proceeds to 410. Otherwise, the process ends.

In one or more embodiments, high toggle rates at the outputs of the gates correlate well with smaller, and thus more refined, gate classes (i.e., only a small number of members in each gate class). In other words, when there are high toggle rates, it is easy to observe that the outputs of two gates are not always equivalent (or that one gate does not always output the inverse of the other gate), and thus these two gates do not belong to the same gate class. Accordingly, it may be advantageous to determine and apply (e.g., input) simulation patterns that result in high toggle rates at the output of the gates in order to refine gate classes early on and reduce the number of false candidates for merging.

Further, simulation patterns that increase the toggle rates of the upper-level gates (closer to the primary outputs) are likely to also increase the toggle rates of lower level gates. By evaluating the upper-level gates first (i.e., inverse topological ordering at 410) and applying (e.g., inputting) simulation patterns that increase the toggle rates of these upper-level gates, the toggle rates of the lower-level gates will likely also increase. When it later comes time to evaluate the toggle rates of lower-level gates, many of the lower-level gates will now have toggle rates that equal or exceed the toggle threshold (the answer at 420 will be "NO"). This enables the expensive SAT-solver call at 435 to be skipped for many of the lower-level gates, reducing the computational time for the process depicted in FIG. 4.

Following the execution of the process depicted in FIG. 4, the outputs at all the gates may be used to group the gates into gate classes (discussed above). This effectively corresponds to 305 in FIG. 3.

Additionally or alternatively, all of the additional simulation patterns and auxiliary simulation patterns that have been determined/generated from the multiple visits to 435 and 445 may be stored as a set of simulation patterns and applied at a future time to the circuit design to determine gate classes. The set of simulation patterns may be applied in a random order.

Although the process depicted in FIG. 4 utilizes toggle rates, other characteristics may be used as well including, for example, distribution of bits, alignment with respect to other patterns, etc.

Figure 5:
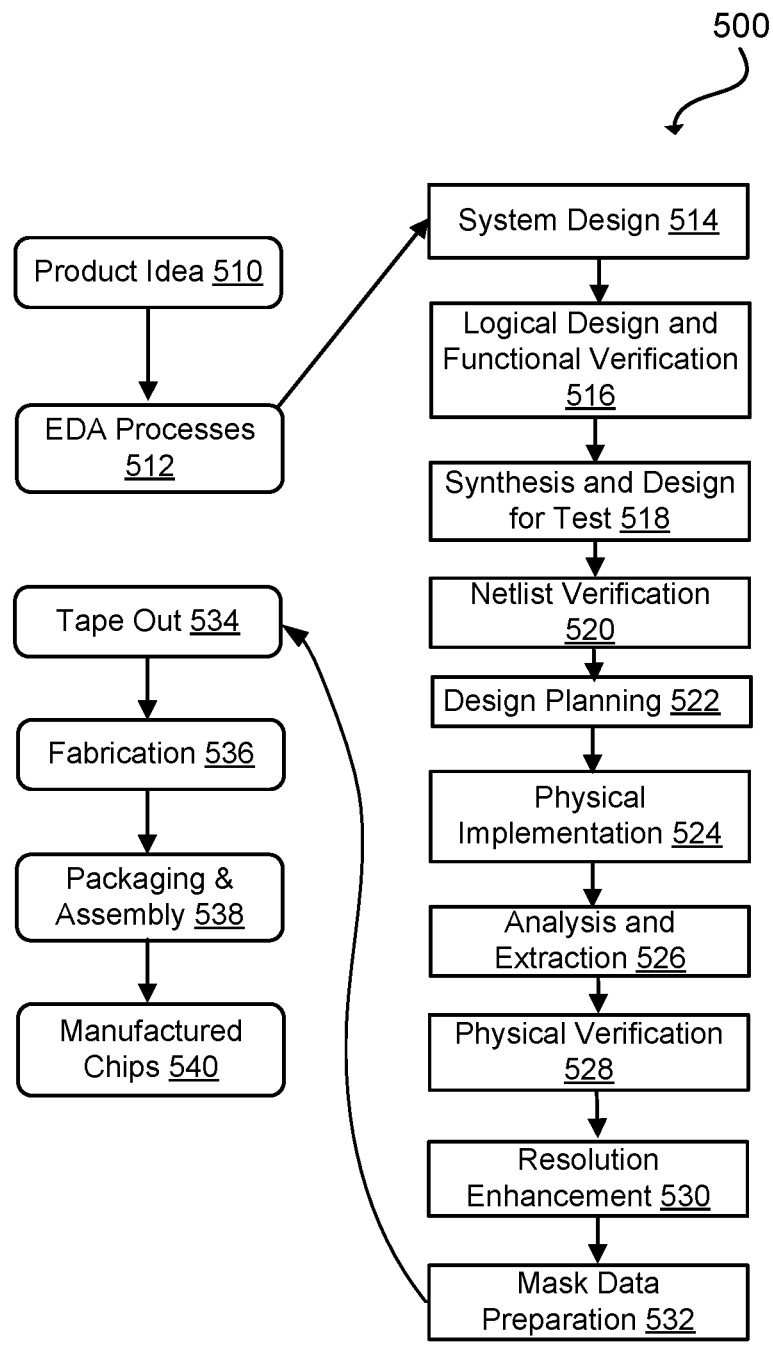
FIG. 5 depicts a flowchart of various processes used during the design and manufacture of an integrated circuit in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described by be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Figure 6:
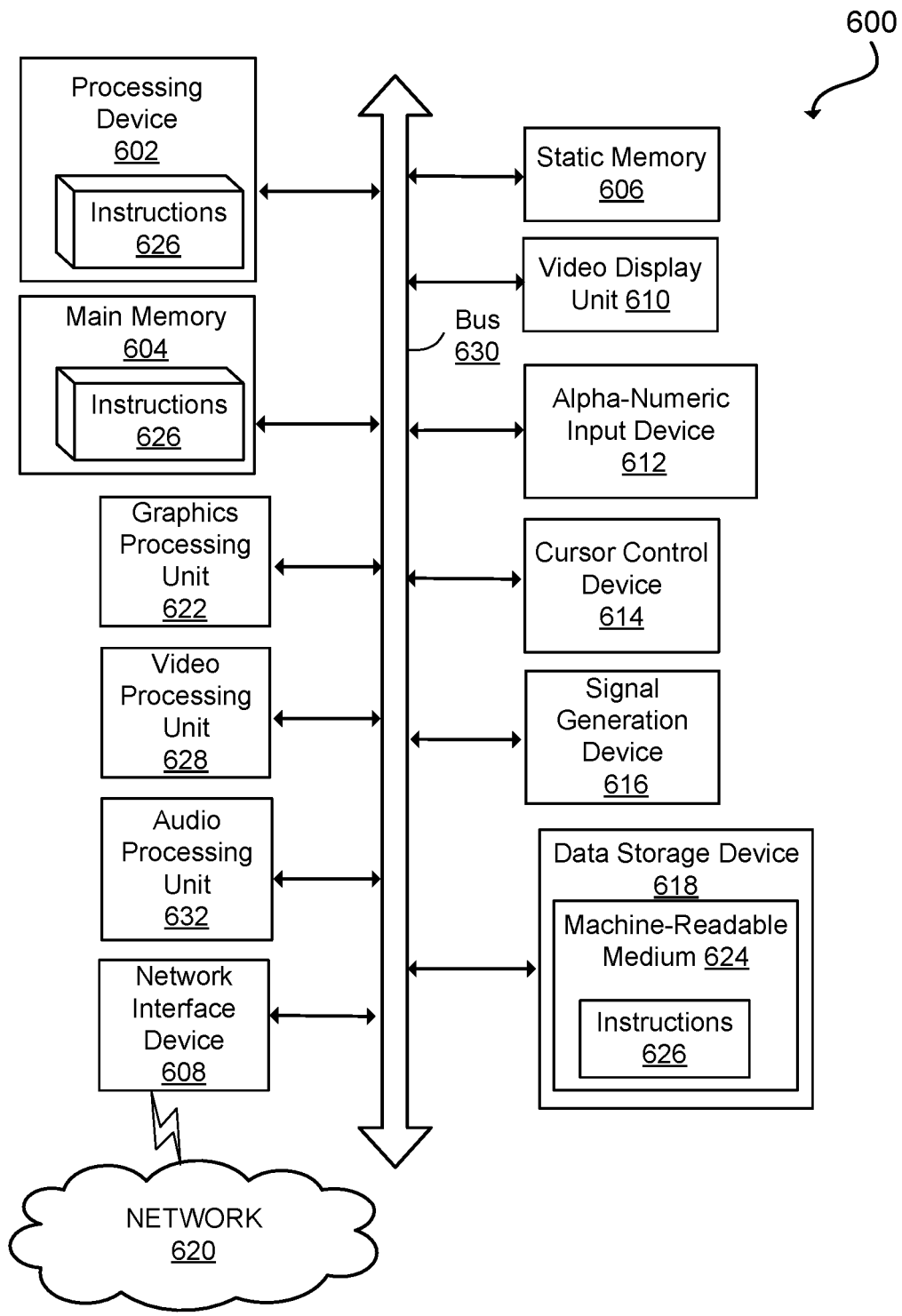
FIG. 6 depicts an abstract diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   determining a plurality of gate classes by inputting a plurality of simulation pattern inputs to a plurality of gates in a gate network of an integrated circuit design;
   selecting, by a processor, a first candidate gate from the plurality of gates based on an inverse topological ordering of the plurality of gates, wherein selecting based on the inverse topological ordering comprises selecting gates closer to a primary output of the gate network before selecting gates further away from the primary output;
   determining a first subset of the plurality of gates belonging to a first gate class comprising the first candidate gate;
   selecting a first driver gate from the first subset of the plurality of gates;
   obtaining a first confirmed equivalence after calling a SAT-solver based on the first candidate gate and the first driver gate; and
   modifying, based on the first confirmed equivalence, the integrated circuit design by merging the first candidate gate and the first driver gate.

2. The method of claim 1, wherein selecting the first driver gate is based on one or more of a topological ordering and a polarity ordering of the first subset of the plurality of gates.

3. The method of claim 2, wherein merging the first candidate gate and the first driver gate comprises:
   determining a local input connected to a local output of the first candidate gate; and
   inserting a connection in the integrated circuit design between a local output of the first driver gate and the local input.

4. The method of claim 3, wherein the connection comprises an inverter gate in response to the first driver gate being a complementation of the first candidate gate.

5. The method of claim 1, further comprising:
   selecting a second candidate gate from the plurality of gates based on the inverse topological ordering of the plurality of gates;
   determining a second subset of the plurality of gates belonging to a second gate class comprising the second candidate gate;
   selecting a second driver gate from the second subset of the plurality of gates based on a topological and polarity ordering of the second subset of gates;
   obtaining a counter-example simulation pattern after calling the SAT-solver based on the second candidate gate and the second driver gate;
   executing an incremental simulation of the integrated circuit design based on the counter-example simulation pattern; and
   determining a refined second subset of the plurality of gates by removing at least the second driver gate from the second subset of the plurality of gates based on the incremental simulation.

6. The method of claim 5, further comprising:
   selecting a third driver gate from the refined second subset of the plurality of gates;
   obtaining a second confirmed equivalence by calling the SAT-solver based on the second candidate gate and the third driver gate; and
   modifying, based on the second confirmed equivalence, the integrated circuit design by merging the second candidate gate and the third driver gate.

7. The method of claim 1, further comprising:
   selecting a second candidate gate from the plurality of gates based on the inverse topological ordering of the plurality of gates;
   determining a second subset of the plurality of gates belonging to a second gate class comprising the second candidate gate;
   selecting a second driver gate from the second subset of the plurality of gates;
   obtaining an undeterminable (unDET) response after calling the SAT-solver based on the second candidate gate and the second driver gate; and
   marking the second candidate gate as excluded based on the unDET response.

8. The method of claim 1, wherein inputting the plurality of simulation patterns comprises:
   inputting a plurality of random simulation patterns to the plurality of gates;
   selecting a first test gate from the plurality of gates based on the inverse topological ordering of the plurality of gates;
   determining a toggle rate of a local output of the test gate;
   executing a comparison of the toggle rate with a toggle threshold;
   determining, based on the comparison, a next bit for the local output of the test gate that increases the toggle rate;
   determining an additional simulation pattern by calling another SAT-solver based on the next bit and the plurality of gates; and
   incrementally simulating the plurality of gates based on the additional simulation pattern to trigger the next bit at the local output of the test gate.

9. The method of claim 1, wherein inputting the plurality of simulation patterns further comprises:
   determining an auxiliary simulation pattern that has Hamming distance 1 from the additional simulation pattern; and
   incrementally simulating the plurality of gates based on the auxiliary simulation pattern.

10. A system comprising:
    a memory storing instructions; and
    a processor, coupled with the memory and to execute the instructions, the instructions when executed cause the processor to:
    determine a plurality of gate classes by inputting a plurality of simulation patterns to a plurality of gates in a gate network of an integrated circuit design;
    select a first candidate gate from the plurality of gates based on an inverse topological ordering of the plurality of gates, wherein selecting based on the inverse topological ordering comprises selecting gates closer to a primary output of the gate network before selecting gates further away from the primary output;

determine a first subset of the plurality of gates belonging to a first gate class comprising the first candidate gate;

select a first driver gate from the first subset of the plurality of gates;

obtain a first confirmed equivalence after calling a SAT-solver based on the first candidate gate and the first driver gate; and modify, based on the first confirmed equivalence, the integrated circuit design by merging the first candidate gate and the first driver gate.

11. The system of claim 10, wherein merging the first candidate gate and the first driver gate comprises:

determining a local input connected to a local output of the first candidate gate; and inserting a connection in the integrated circuit design between a local output of the first driver gate and the local input, wherein the connection comprises an inverter gate in response to the first driver gate being a complementation of the first candidate gate, and wherein selecting the first driver gate is based on a topological and polarity ordering of the first subset of the plurality of gates.

12. The system of claim 10, wherein the instructions, when executed, further cause the processor to:

select a second candidate gate from the plurality of gates based on the inverse topological ordering of the plurality of gates;

determine a second subset of the plurality of gates belonging to a second gate class comprising the second candidate gate;

select a second driver gate from the second subset of the plurality of gates based on a topological and polarity ordering of the second subset of gates;

obtain a counter-example simulation pattern after calling the SAT-solver based on the second candidate gate and the second driver gate;

execute an incremental simulation of the integrated circuit design based on the counter-example simulation pattern; and determine a refined second subset of the plurality of gates by removing at least the second driver gate from the second subset of the plurality of gates based on the incremental simulation.

13. The system of claim 12, wherein the instructions, when executed, further cause the processor to:

select a third driver gate from the refined second subset of the plurality of gates;

obtain a second confirmed equivalence by calling the SAT-solver based on the second candidate gate and the third driver gate; and modify, based on the second confirmed equivalence, the integrated circuit design by merging the second candidate gate and the third driver gate.

14. The system of claim 10, wherein the instructions, when executed, further cause the processor to:

select a second candidate gate from the plurality of gates based on the inverse topological ordering of the plurality of gates;

determine a second subset of the plurality of gates belonging to a second gate class comprising the second candidate gate;

select a second driver gate from the second subset of the plurality of gates;

obtain an undeterminable (unDET) response after calling the SAT-solver based on the second candidate gate and the second driver gate; and mark the second candidate gate as excluded based on the unDET response.

15. The system of claim 10, wherein inputting the plurality of simulation patterns comprises:

inputting a plurality of random simulation patterns to the plurality of gates;

selecting a first test gate from the plurality of gates based on the inverse topological ordering of the plurality of gates;

determining a toggle rate of a local output of the test gate;

executing a comparison of the toggle rate with a toggle threshold;

determining, based on the comparison, a next bit for the local output of the test gate that increases the toggle rate;

determining an additional simulation pattern by calling another SAT-solver based on the next bit and the plurality of gates;

determining an auxiliary simulation pattern that has Hamming distance 1 from the additional simulation pattern; and incrementally simulating the plurality of gates based on the additional simulation pattern and the auxiliary simulation pattern.

16. A non-transitory computer readable medium comprising stored instructions, which when executed by a processor, cause the processor to:

determine a plurality of gate classes by inputting a plurality of simulation patterns to a plurality of gates in a gate network of an integrated circuit design;

select a first candidate gate from the plurality of gates based on an inverse topological ordering of the plurality of gates, wherein selecting based on the inverse topological ordering comprises selecting gates closer to a primary output of the gate network before selecting gates further away from the primary output;

determine a first subset of the plurality of gates belonging to a first gate class comprising the first candidate gate;

select a first driver gate from the first subset of the plurality of gates;

obtain a first confirmed equivalence after calling a SAT-solver based on the first candidate gate and the first driver gate; and modify, based on the first confirmed equivalence, the integrated circuit design by merging the first candidate gate and the first driver gate.

17. The non-transitory computer readable medium of claim 16, wherein merging the first candidate gate and the first driver gate comprises:

determining a local input connected to a local output of the first candidate gate; and inserting a connection in the integrated circuit design between a local output of the first driver gate and the local input, wherein selecting the first driver gate is based on a topological and polarity ordering of the first subset of the plurality of gates, and wherein the connection comprises an inverter gate in response to the first driver gate being a complementation of the first candidate gate.

18. The non-transitory computer readable medium of claim 16, wherein the instructions, when executed, further cause the processor to:
- select a second candidate gate from the plurality of gates based on the inverse topological ordering of the plurality of gates;
- determine a second subset of the plurality of gates belonging to a second gate class comprising the second candidate gate;
- select a second driver gate from the second subset of the plurality of gates based on a topological and polarity ordering of the second subset of gates;
- obtain a counter-example simulation pattern after calling the SAT-solver based on the second candidate gate and the second driver gate;
- execute an incremental simulation of the integrated circuit design based on the counter-example simulation pattern;
- determine a refined second subset of the plurality of gates by removing at least the second driver gate from the second subset of the plurality of gates based on the incremental simulation;
- select a third driver gate from the refined second subset of the plurality of gates;
- obtain a second confirmed equivalence by calling the SAT-solver based on the second candidate gate and the third driver gate; and
- modify, based on the second confirmed equivalence, the integrated circuit design by merging the second candidate gate and the third driver gate.

19. The non-transitory computer readable medium of claim 16, wherein the instructions, when executed, further cause the processor to:
- select a second candidate gate from the plurality of gates based on the inverse topological ordering of the plurality of gates;
- determine a second subset of the plurality of gates belonging to a second gate class comprising the second candidate gate;
- select a second driver gate from the second subset of the plurality of gates;
- obtain an undeterminable (unDET) response after calling the SAT-solver based on the second candidate gate and the second driver gate; and
- mark the second candidate gate as excluded based on the unDET response.

20. The non-transitory computer readable medium of claim 16, wherein inputting the plurality of simulation patterns comprises:
- inputting a plurality of random simulation patterns to the plurality of gates;
- selecting a first test gate from the plurality of gates based on the inverse topological ordering of the plurality of gates;
- determining a toggle rate of a local output of the test gate;
- executing a comparison of the toggle rate with a toggle threshold;
- determining, based on the comparison, a next bit for the local output of the test gate that increases the toggle rate;
- determining an additional simulation pattern by calling another SAT-solver based on the next bit and the plurality of gates; and
- determining an auxiliary simulation pattern that has Hamming distance 1 from the additional simulation pattern; and
- incrementally simulating the plurality of gates based on the additional simulation pattern and the auxiliary simulation pattern.

* * * * *